United States Patent [19]

MacWilliams et al.

[11] Patent Number: 4,654,277

[45] Date of Patent: Mar. 31, 1987

[54] METHOD FOR IMPARTING FLAME RESISTANCE TO WOOD USING DIMETHYL(OXIRANYLMETHYL)PHOSPHONATE

[75] Inventors: Dalton C. MacWilliams, Alamo; H. Nelson Beck, Walnut Creek, both of Calif.

[73] Assignee: The Dow Chemical Company, Midland, Mich.

[21] Appl. No.: 809,686

[22] Filed: Dec. 16, 1985

[51] Int. Cl.[4] .............................................. B32B 21/00

[52] U.S. Cl. ..................................... 428/704; 428/541; 428/921

[58] Field of Search ........................ 428/704, 541, 921

[56] References Cited

U.S. PATENT DOCUMENTS 2,627,521 2/1953 Coover ............................... 260/348

OTHER PUBLICATIONS

Kirk-Othmer, vol. 24, pp. 579–611 (1984), "Encyclopaedia of Science and Technology".

Willard, H. H., et al., VanNostrand Co., Inc., New York, 1943, p. 207, "Advanced Quantitative Analysis".

*Primary Examiner*—Marion C. McCamish

[57] ABSTRACT

A method for imparting flame resistance to exposed surfaces of wood by impregnating and reacting wood surfaces with dimethyl(oxiranylmethyl)phosphonate (DMOMP) is described. The resulting treated wood products are useful in applications where flame resistance is important.

20 Claims, 4 Drawing Figures

METHOD FOR IMPARTING FLAME RESISTANCE TO WOOD USING DIMETHYL(OXIRANYLMETHYL)PHOSPHONATE

BACKGROUND OF THE INVENTION (1) Field of the Invention

The present invention relates to a method for imparting flame resistance to wood using dimethyl(oxiranylmethyl)phosphonate (DMOMP) as an impregnant. In particular, the present invention relates to the impregnating of DMOMP into the wood and reacting the DMOMP with the wood to chemically bind it in situ.

(2) Prior Art

U.S. Pat. No. 2,627,521 to Coover describes the use of oxirane containing phosphonates, including DMOMP, in cellulose derivatives and in polyvinyl resins as plasticizers and stabilizers. There is no suggestion that this compound can be used to impregnate the exposed surfaces of wood to impart flame resistance. It is believed that the "cellulose derivatives" referred to by Coover are polymers prepared from cellulose derivatives (e.g. cellulose acetate). Coover also describes a process which can be used to prepare DMOMP.

The use of wood for shingles, siding for housing and the like is well known. The problem is to impart some level of flame resistance to these and other wood products.

OBJECTS

It is therefore an object of the present invention to provide a method for imparting flame resistance to wood by impregnating and reacting a wood surface with DMOMP. Further it is an object of the present invention to provide a method which is simple and economical to perform. These and other objects will become increasingly apparent by reference to the following description and the drawings.

IN THE DRAWINGS

GENERAL DESCRIPTION

Figure 1:
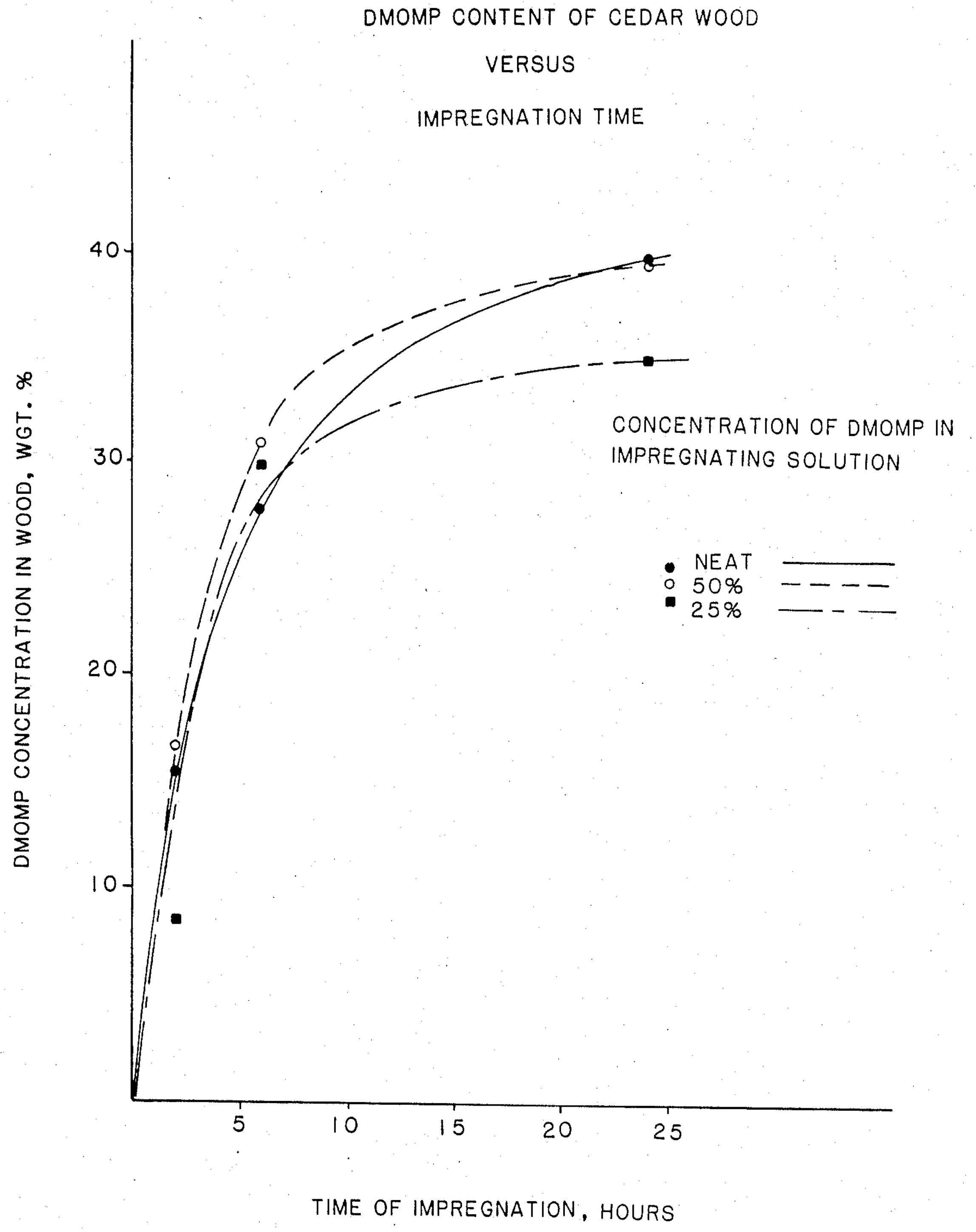
FIG. 1 is a graph showing DMOMP concentration in cedar wood as a function of impregnation time and concentration of DMOMP alone or in an unreactive impregnating liquid.

The present invention relates to a method for imparting flame resistance to wood which comprises: impregnating exposed surfaces of wood with dimethyl (oxiranylmethyl) phosphonate (DMOMP, also known as dimethyl-2,3-epoxypropyl phosphonate); and reacting the dimethyl(oxiranylmethyl) phosphonate with the wood to produce a flame resistant treated wood with the reacted phosphonate chemically bound in the treated wood. Further the present invention relates to a flame resistant treated wood produced by reacting dimethyl(oxiranylmethyl) phosphonate with exposed surfaces of the wood, wherein the flame resistant treated wood has a Limiting Oxygen Index as measured by ASTMD2863-70 of above about 30 percent oxygen.

The exposed surfaces of wood which are impregnated by the method of the present invention can be in the form of solid wood, particle board or a reconstituted wood fiber product. All that is necessary is that there be a wood surface which is exposed for impregnation by the DMOMP.

The exposed surface of the wood preferably is at least partially dried so that there are open pores in the exposed surface. The woods can be soft or hard and of any species. There are numerous publications describing the pore characteristics of various species of wood and a discussion can be found in Kirk-Othmer, Volume 24, pages 579 to 611 (1984). Page 585 shows the relative permeability of woods to liquids under pressure. Usually soft woods, particularly coniferous woods, have pores which are more readily impregnated by the method of the present invention than hard woods. Cedar is an example of a wood which has poor permeability even though it is relatively soft. Coniferous woods contain natural resins which can aid in binding the DMOMP.

The drying of the wood is by conventional means. Freshly cut wood contains about 47 to 50% by weight moisture depending upon the species and growing conditions. Air dried wood contains about 20% by weight moisture and kiln dried wood contains about 6% by weight moisture. It will be appreciated that the percent moisture removed from the wood is not important so long as there are exposed pores in the surface of the wood. Preferably the percent moisture is between 0 and 30% by weight for the purpose of the present invention.

The wood can have any convenient form or shape so long as it can be impregnated by the DMOMP. A preferred form for impregnation by the method of the present invention is siding or roofing shingles which are usually composed of solid wood. The treatment of cedar siding and shingles is especially preferred.

The flammability of the treated wood product is tested by the Limiting Oxygen Index (LOI) method (ASTM D2863-70). This method measures flammability as function of the percentage of oxygen in nitrogen to which the wood is exposed as a flame as applied to a surface. This is compared to the flammability of untreated wood in air. Wood was considered to "burn" if it (a) remained aflame for 60 seconds or (2) was completely consumed by the flame. Untreated dry cedar wood burns in 21% oxygen and thus its LOI is 21%. It will be appreciated that only the treated surface(s) of the wood is exposed to the flame since untreated surfaces would have normal flammability. The method of the present invention is able to significantly increase the LOI of the treated wood as a result of impregnating and reacting it with DMOMP. Thus a doubling of the LOI can be achieved where all of the exposed surfaces of the wood are impregnated with DMOMP. The resulting wood has an LOI of above 30 percent oxygen, preferably between 35 and 50 percent oxygen. The wood preferably contains DMOMP at least at the exposed surfaces in an amount which is between about 14 and 44 percent of the weight of the wood to a depth of about 5 to 10 mm. The total weight percent of DMOMP impregnated into the wood thus depends upon the thickness of the wood being treated.

The impregnation of the wood can be accomplished by any convenient method preferably by absorption from DMOMP alone or in a non-reactive impregnating liquid carrier. It is possible to spray the DMOMP onto the wood at a velocity sufficient to impregnate the pores of the wood. It is also possible to (1) pressurize the DMOMP into the wood or (2) evacuate air from the pores of the wood with a partial vacuum which removes air from the wood so that the DMOMP is more readily impregnated into the pores. These latter methods rely upon differential pressures from ambient pressures.

Where elevated pressures are used, these can be between about 5 and 1000 psig (351.5 to 70360 gms per square cm). Preferably the elevated pressures are between about 20 and 100 psig (1406 and 7030 gms per square cm). Where a vacuum is used for the impregnation, the wood can be coated with the DMOMP and provided in a confined space. The partial vacuum is then applied to impregnate the DMOMP into the wood. Alternatively the wood can be immersed in the DMOMP in a confined space and then the vacuum applied to remove air from the pores and impregnate the wood. Vacuums between −3 and −14.5 psig (−210.9 to −1019.35 gms per square cm) can be used.

For ease of handling, preferably the DMOMP contains a ratio of between about 0.01 and 19 parts liquid carrier to DMOMP. Water is the most convenient and inexpensive liquid carrier; however other unreactive liquid carriers can be used such as toluene. All of these variations will be obvious to those skilled in the art.

After the DMOMP is impregnated into the wood, it is reacted with the wood by heating the wood at temperatures above about 100° C., preferably between about 120° C. and 170° C. A temperature between about 130° and 150° C. is most preferred. The DMOMP is stable up to 190° C., but higher heating temperatures above 150° C. cause discoloration and sometimes charring of the wood surfaces.

The heating is usually conducted over a period of at least 10 hours. Preferably the DMOMP is reacted with the wood over a period of between about 12 and 24 hours.

SPECIFIC DESCRIPTION

The following are non-limiting examples of the method of the present invention.

First Series of Examples

DMOMP was provided in cedar wood by soaking strips (previously dried at 90° C.) in aqueous DMOMP solutions for various lengths of time as shown in Table I. The strips were 6–10 mm wide and varied from about 1.3 to 10.8 mm in thickness. Imperfect, knotty, or nonuniform areas were excluded from testing. The treated strips were dried at 90° C. in an air-circulating oven.

Pressure treatment of the strips consisted of immersing the dried splints in neat DMOMP in a steel pressure bomb (length 8 ½", O.D. 1 ½", and I.D. 13/16"; 21.59 cm O.D., 3.81 cm and I.D. 2.06 cm) followed by pressurization with nitrogen to 40 psi (2812 gms per square cm) for 2 to 24 hours. Fire resistance was determined on dried splints by measuring the Limiting Oxygen Index (LOI) using the equipment and a variation of the technique described in ASTM Designation D2863-70. Splints were ignited at a top corner by a 2 second exposure to a hydrogen flame. The burning time was noted after the hydrogen flame was removed The splints were extracted with water by placing them in a graduated cylinder with a hose placed to the bottom of the cylinder; room temperature water was circulated rapidly around the splints and allowed to overflow the cylinder. Each extraction lasted about 20 hours. LOI's were again determined on the dried splints.

The results are shown in Table I.

TABLE I

RELATIVE FLAMMABILITY OF CEDAR SHINGLES TREATED WITH DMOMP

| Concentration of Aqueous DMOMP | Time in Aqueous DMOMP | Time Heated at 150° C. | LOI, %, After Water Extraction: 0 Extractions | 1 Extraction | 2 Extractions | 3 Extractions |
|---|---|---|---|---|---|---|
| — | — | — | 21 | — | — | — |
| 10 wt. % | 17-22 hrs. | — | 27-30 | 24-27 | — | — |
| 10 | 67-72 | — | 27 | 24-26 | 23 | 22 |
| 25 | 17-22 | — | 28-34 | 25-29 | — | — |
| 25 | 67-73 | — | 34-36 | 27-30 | 26-29 | 25 |
| 25 | 73 | 1 hr. | — | 29 | 28 | — |
| 25 | 73 | 5 | — | 38-40 | 33 | — |
| 25 | 73 | 24 | — | 44 | 37-42 | — |
| 25 | 70 | — | 31 | 25-28 | — | — |
| 25 | 70 | — | 34-35 | 25-27 | — | — |
| 25 | 70 | — | 34 | 27 | — | — |
| 25 | 70 | — | 37 | 27-29 | — | — |
| 25 | 70 | — | 30-33 | 29 | — | — |
| 25 | 70 | — | 31-33 | 30 | — | — |
| 25 pot[a] | 72 | — | — | 27 | 26-28 | — |
| 25 pot[a] | 72 | 24 | — | 42 | 39 | — |
| 50 | 17-22 | — | 29-45 | 27-32 | 29 | — |
| 50 | 67-73 | — | >50 | 29-32 | 27-31 | 27-28 |
| 50 | 73 | 1 | — | 31-33 | 29 | — |
| 50 | 73 | 5 | — | 39-41 | 35 | 32-33 |
| 50 | 73 | 24 | — | >50 | >50 | >50 |
| 50 pot[a] | 72 | — | — | 28 | 28 | — |
| 50 pot[a] | 72 | 24 | — | 44 | 39 | — |
| neat/40 psi[b] | 2½ | — | — | 29-33 | — | — |
| neat/40 psi[b] | 5 | — | — | 27-33 | — | — |
| neat/40 psi[b] | 24 | — | — | 27-29 | — | — |
| neat/40 psi[b] | 2 | 24 | — | >50 | — | — |
| neat/40 psi[b] | 5 | 24 | — | >50 | — | — |
| neat/40 psi[b] | 24 | 24 vac/$N_2$[c] | — | 30-31 | — | — |

TABLE I-continued

| RELATIVE FLAMMABILITY OF CEDAR SHINGLES TREATED WITH DMOMP | | | | | | |
|---|---|---|---|---|---|---|
| Concentration of Aqueous DMOMP | Time in Aqueous DMOMP | Time Heated at 150° C. | LOI, %, After Water Extraction 0 Extractions | 1 Extraction | 2 Extractions | 3 Extractions |
| neat/40 psi[b] | 2½ | — | — | 23 | — | — |
| neat/40 psi[b] | 5 | — | — | 23-24 | — | — |
| neat/40 psi[b] | 24 | — | — | 22 | — | — |

[a]Pot residue after distillation.
[b]Pressure treatment.
[c]Samples were heated in vacuum oven in nitrogen at 145° C. for 24 hours following 5 evacuations and refillings with nitrogen. At the end of the heating period the inside of the oven was coated with a liquid layer (probably DMOMP), but thesplints were not black in color as they usually were after 24 hours heating.

LOI data in Table I show the relative flammability of cedar shingle splints that were treated under various conditions with DMOMP. Untreated wood burns readily in normal air, LOI 21% oxygen. DMOMP is a good fire retardant for wood and LOI's from 27 to in excess of 50 were observed for treated samples before water extraction. The LOI's increased with concentration of DMOMP and treatment time. The fire retardancy decreased with increasing number of water extractions which indicates that the DMOMP was not completely bonded to the cellulose and was subject to removal by a leaching and diffusion process. Heating the treated samples in air at 150° C. prior to water extraction resulted in improved fire and water resistance and the LOI values increased with both treatment and heating times.

Pressure impregnation of the wood with neat DMOMP followed by heating at elevated temperature resulted in faster impregnation (e.g. 2 hours versus 73 hours for similar LOI values) and more uniform distribution of the fire retardant. Solution treated splints were nonhomogeneous in appearance with darker color, indicative of higher DMOMP concentration, being observed on the outer layers and edges which was due to the slow diffusion-limited migration of DMOMP through the wood. Solution treated splints showed variability in burning behavior and the center or the broken end of such specimens burn in a lower oxygen concentration than do the outer layers. Pressure treated splints were uniform in appearance and cross-section, and their burning characteristics were more uniform.

Treated shingles which exhibited high LOI values were dark brown to black in color compared to the light tan to light brown color of untreated wood. The discoloration forms upon heating. The degree of discoloration is a function of the temperature, time of heating, and concentration of DMOMP. The discoloration may be due to reaction, e.g. dehydration, of the cellulose with acidic groups (e.g. POH), to air oxidation, or to exothermal degradation of some of the DMOMP.

Second Series of Examples

Wood was impregnated in two stainless steel pressure bombs (one with length 8 ½", O.D. 1 ½", and I.D. 13/16" (21.59 cm, O.D. 3.81 and I.D. 2.06 cm; the other 10 ½", 1 3/10", and 1 1/10" (26.67 cm, O.D. 3.30 cm and I.D. 2.79 cm), by soaking wood splints in various concentrations of aqueous DMOMP at 40 psi (2812 grams per square cm) for 2, 6 or 24 hours. The splints were previously oven-dried at 90° C. before impregnation. The splints were 5 to 10 mm thick, 8 to 10 mm wide, and 70 to 100 mm long. The impregnated splints were dried in an air circulating oven at 150° C. for 24 hours, extracted with flowing water at room temperature for 24 hours, and finally oven dried at 150° C. for 24 hours.

Phosphorus analyses on impregnated splints were obtained colorimetrically as molybdenum blue using the stannous chloride test method (H. H. Willard and H. Diehl, "Advanced Quantitative Analysis", VanNostrand Co., Inc., New York, 1943, page 207). Neat DMOMP, molecular weight 166.115, contains 18.65% phosphorus. The DMOMP concentration in the wood was obtained by multiplying the percent phosphorus by 100/18.65 or 5.362.

Cedar wood splints were impregnated with DMOMP. The data for these experiments are shown in Table II and include the concentration of DMOMP in the impregnating liquid, the impregnation time, the LOI values, and the concentration of phosphorus and DMOMP found in the wood after impregnation at 40 psi (2812 gram per sq. cm) pressure followed by drying ("curing") at 150° C., water extraction at room temperature for 24 hours, and drying at 150° C.

TABLE II

EFFECT OF DMOMP CONCENTRATION ON LOI OF CEDAR WOOD SPLINTS

| DMOMP Conc.[a] | Impregnation Time, Hours[b] | Conc. of P, %, in Wood | Conc. of DMOMP, %, in Wood | LOI, % $O_2$ |
|---|---|---|---|---|
| 25 | 2 | 1.56 | 8.4 | 36 |
| 50 | 2 | 3.11 | 16.7 | >50 |
| 100 | 2 | 2.88 | 15.4 | 45 |
| 25 | 6 | 5.6 | 30.0 | 44 |
| 50 | 6 | 5.8 | 31.1 | 44 |
| 100 | 6 | 5.2 | 27.9 | 45 |
| 0 | 24 | — | — | 21 |
| 10 | 24 | 3.27 | 17.5 | 35-36 |
| 20 | 24 | 4.99 | 26.8 | 39-42 |
| 30 | 24 | 8.09 | 43.4 | 48-50 |
| 40 | 24 | 6.50 | 34.9 | >50 |
| 50 | 24 | 7.34 | 39.4 | >50 |
| 60 | 24 | 5.74 | 30.8 | >50 |
| 70 | 24 | 9.69 | 52.0 | >50 |
| 80 | 24 | 7.74 | 41.5 | 48-50 |
| 90 | 24 | 6.79 | 36.4 | 47-50 |
| 100 | 24 | 7.42 | 39.8 | 46-48 |
| Pot Residue[c] | 24 | 12.35 | 66.2 | >50 |

[a]Concentration of DMOMP, volume percent, in the impregnating liquid.
[b]Impregnated at 40 psi pressure, followed by drying at 150° C. for 24 hours, water extraction for 24 hours, and finally drying at 150° C. for 24 hours.
[c]The pot residue includes oligomers of from 2 to about 4 units of DMOMP and is also effective to impart flame resistance. As used herein, the term "DMOMP" includes such oligomers.

FIG. 1 shows the increase in DMOMP in the wood with increasing impregnation time for three concentrations of impregnating liquid. Impregnation of the wood splints was essentially complete after about 5 to 10 hours and further increase in impregnation time resulted in only minimal increase in the DMOMP content of the wood. These data apply only to certain size, geometry, and volume of splints, to specific pressure bomb geometry and capacity and to a specified total amount of DMOMP available for impregnation. The plateauing of the curve after about 5 to 10 hours could be attributed to a limited amount of DMOMP or to preferential absorption of water into the wood as well as to the overall diffusion rate into the wood. In any case the rate of impregnation at 40 psi (2812 gm per sq. cm) is relatively slow.

Figure 2:
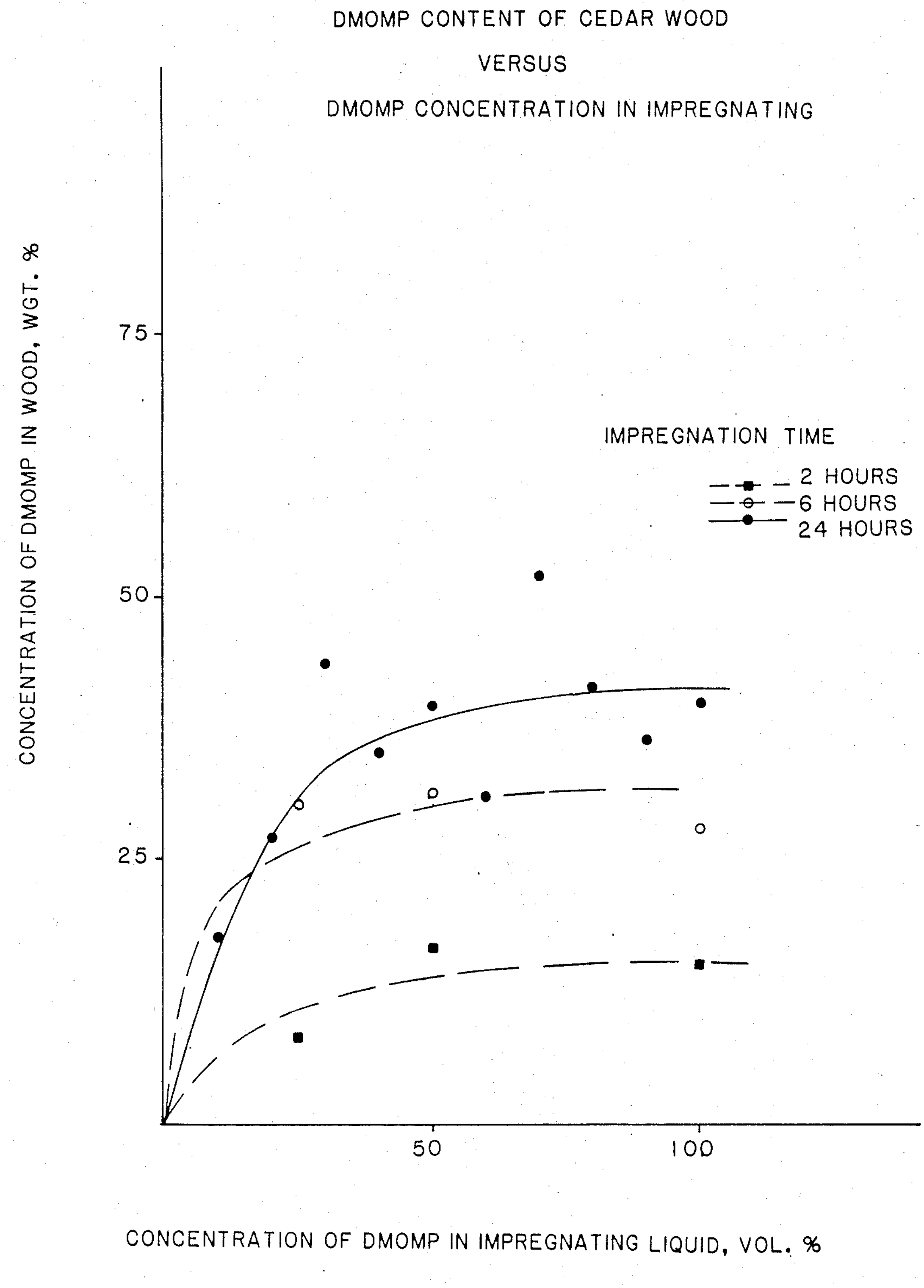
FIG. 2 is a graph showing the concentration of DMOMP in cedar wood as a function of the concentration of DMOMP in the impregnating liquid carrier over various impregnation time periods.

FIG. 2 is a plot of the increase in DMOMP in the wood with increasing concentration of the fire retardant in the impregnating liquid at three different impregnating times. The most DMOMP was observed in the wood when the concentration of DMOMP in the impregnating liquid was in excess of about 30 to 40 percent.

Figure 3:
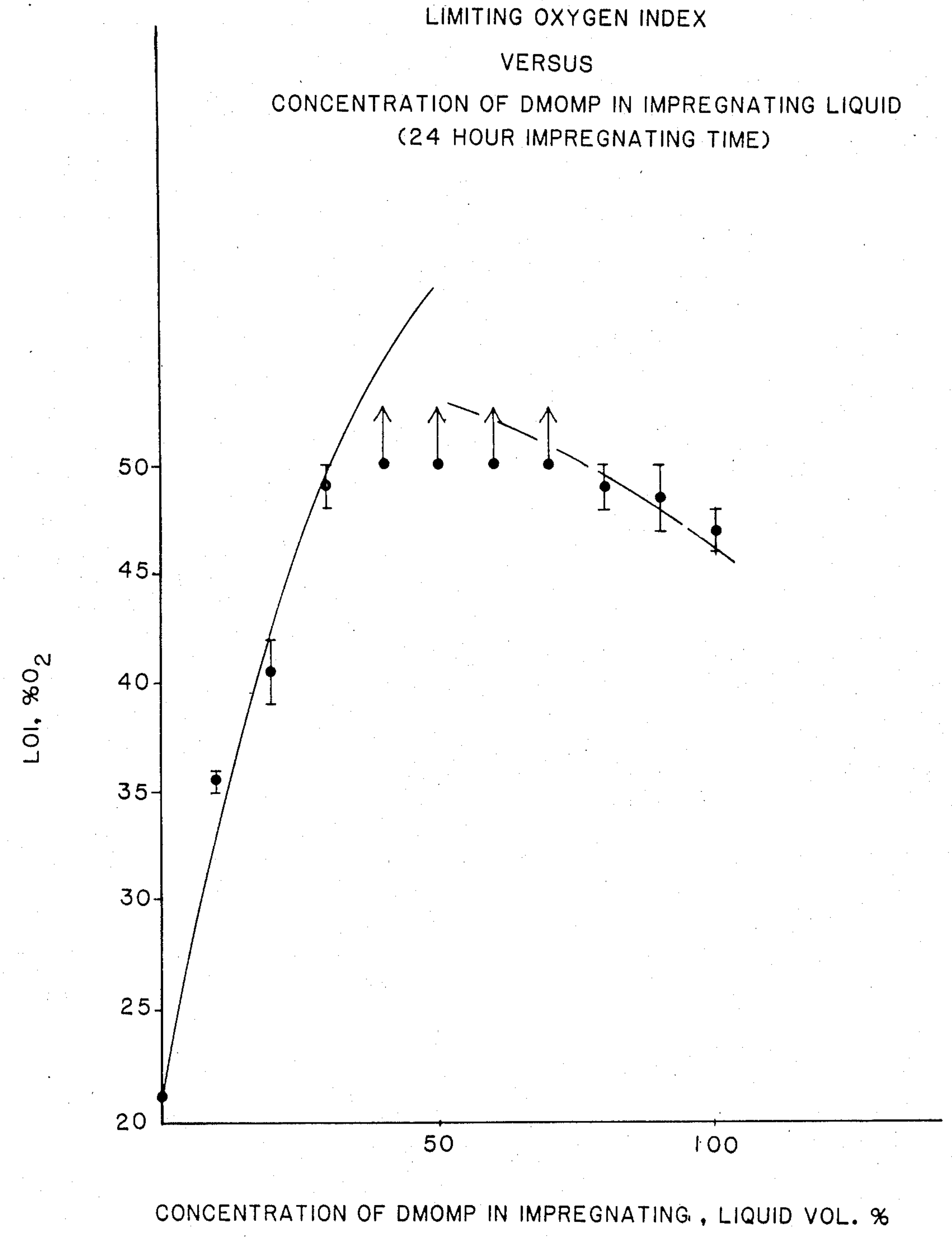
FIG. 3 is a graph showing the Limiting Oxygen Index (LOI; ASTM D 2863-70) of cedar wood as a function of the concentration of DMOMP in the impregnating liquid carrier.

FIG. 3 shows the LOI of the impregnated wood as a function of the concentration of DMOMP in the impregnating liquid for samples impregnated for 24 hours. The highest LOI values were observed when the concentration of DMOMP in the impregnating liquid was in excess of about 30 percent. A leveling off in LOI value at about 47 to 50% oxygen appeared to occur; again, this reflected the mechanism of the particular impregnating conditions and equipment as well as possible limitation in the amount of DMOMP actually available. Similar plots with considerably fewer data points are observed using the data for 2 and 6 hour impregnation times.

Figure 4:
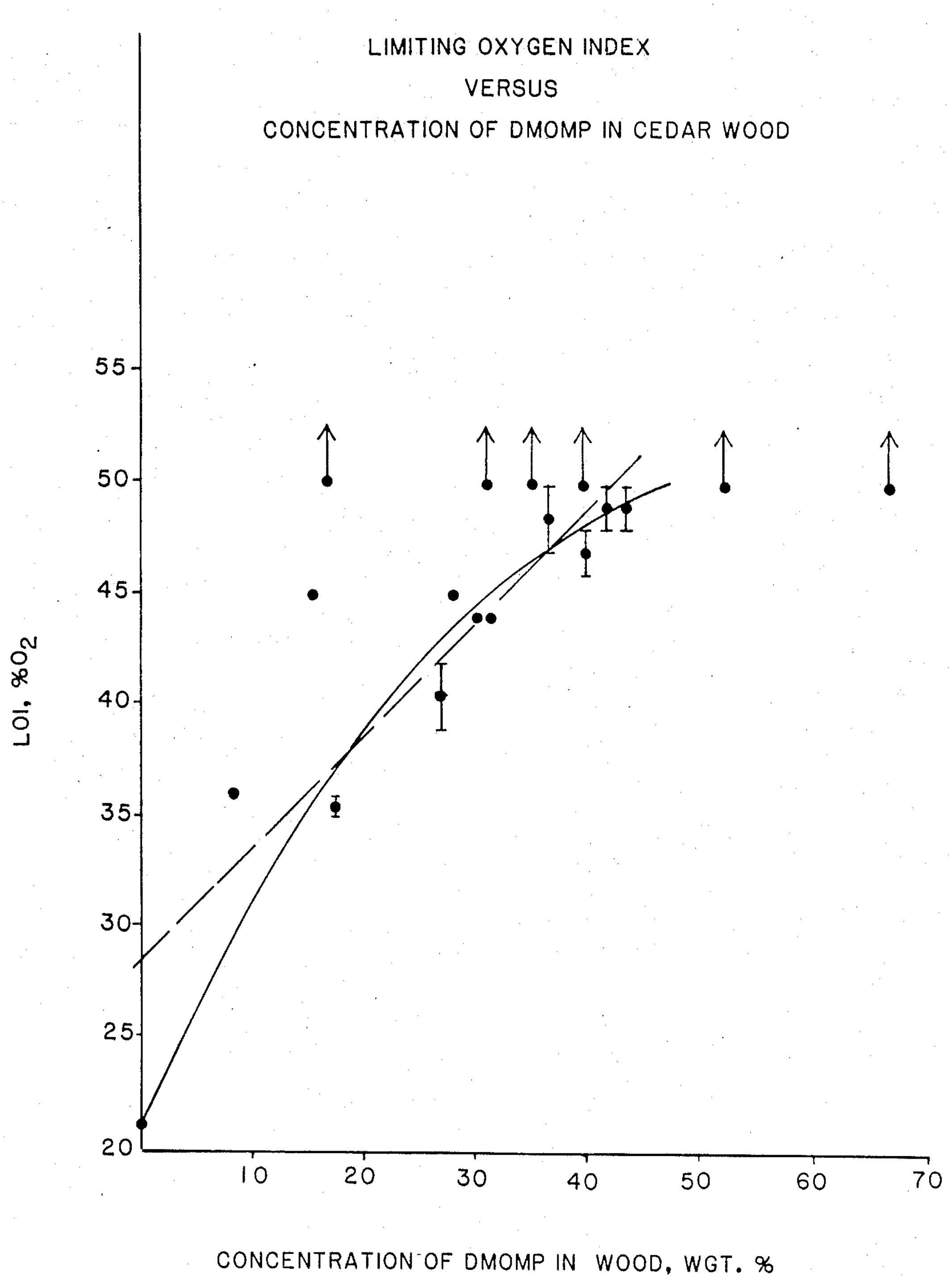
FIG. 4 is a graph showing the LOI versus the concentration of DMOMP in cedar wood.

A plot of the LOI as a function of the concentration of DMOMP in cedar wood is shown in FIG. 4. Six out of the eighteen points represent LOI values in excess of 50% oxygen, which is the limit of the equipment used. The dashed line represents a least squares fit to the remaining twelve points where LOI (% oxygen)−0.518 (DMOMP, wgt. %)+28.3; (r=0.88). The curved line is an approximate fit that gives added emphasis to the point representing untreated wood. These data suggest that an LOI of 50% oxygen requires the presence of about 42 to 46% DMOMP; and about 13 to 15% DMOMP would be expected to result in an LOI of 35% oxygen.

The pressure treated splints of the first series of examples were uniform in appearance, cross-sectional area, and burning characteristics. The splints used in the first series of examples were carefully selected before impregnation to be as uniform as possible. The splints for the second series of examples were selected at random and differed considerably in the grain, the wood density and porosity, the number, size, and type of knots and other imperfections, etc. These inhomogeneities in the wood are reflected in that impregnation varied as to completeness and homogeneity, and the resulting LOI values for "identical" specimens varied occasionally by about five percentage points. Increased pressure, i.e. greater than 40 psig (2812 gm per sq. cm), should prove useful in increasing the impregnation rate and the completeness and homogeneity of penetration.

Table III shows data confirming that DMOMP imparts fire resistance to wood types other than cedar. The LOI values for redwood and common pine-fir plywood were increased to over 40% oxygen by inclusion of 30 to 36% DMOMP.

TABLE III

EFFECT OF DMOMP ON LOI OF REDWOOD AND PLYWOOD SPLINTS

| Wood | DMOMP Conc.[a,b] | Conc. of P, %, in Wood | Conc. of CMOMP, %, in Wood | LOI, % $O_2$ |
|---|---|---|---|---|
| Redwood | 0 | — | — | 23 |
| Redwood | 50 | 6.7 | 35.9 | >50 |
| Plywood | 0 | — | — | 26 |
| Plywood | 50 | 5.6 | 30.0 | 42 |

[a]Concentration of DMOMP, volume percent, in the impregnating liquid.
[b]Wood impregnated for 24 hours at 40 psi pressure followed by drying at 150° C. for 24 hours, water extraction for 24 hours, and finally drying at 150° C. for 24 hours.

The impregnation of DMOMP into cedar wood was followed by a heating or "curing" period at 150° C. for 24 hours. This procedure was found to be essential to "bond" the fire retardant to the cellulose so that it would not be affected by water. The mechanism was believed to be the reaction of the epoxy group with cellulosic hydroxyl groups but could also involve gums and the like in the wood. The elevated temperature used for bonding also results in significant darkening of the wood, possibly other adverse effects such as a lower density and increased porosity, as well as considerable energy usage.

The flammability resistance that DMOMP imparts to wood is related to several essential variables. Such variables include the amount of DMOMP remaining in the wood, the concentration of the impregnating liquid, the time of impregnation, the temperature of bonding, i.e. the probable reaction of the compound with the wood cellulose. Another possible variable is the size, geometry, liquid capacity, etc. of the pressure vessel used for impregnation. The homogeneity of impregnation and the reproducibility of subsequent data depend to a great extent upon the quality of the wood used, e.g. the density, presence of knots, porosity, wood grain configuration, voids, etc. Under the conditions employed in the first and second series of examples, an LOI value of 50% oxygen requires the presence of about 42 to 46 weight percent DMOMP in the wood and 35% oxygen, about 13 to 15 weight percent.

The impregnated sticks of the first and second series of examples can be used as a flame resistant veneer on a wood product. Plywood is especially preferred, particularly where the DMOMP impregnates at least one of the outer layers of the plywood to a glue line with a next adjacent inner layer. Other wood products can be treated in the same manner.

We claim:

1. A method for imparting flame resistance to wood which comprises:
   (a) impregnating exposed surfaces of the wood with dimethyl(oxiranylmethyl) phosphonate; and
   (b) reacting the dimethyl(oxiranylmethyl) phosphonate with the wood to produce a flame resistant treated wood with the reacted phosphonate chemically bound in the treated wood.

2. A method for imparting flame resistance to a wood having a fabricated shape which comprises:
   (a) impregnating exposed surfaces of the wood having the fabricated shape with dimethyl(oxiranylmethyl) phosphonate in a confined chamber at a differential pressure; and
   (b) reacting the dimethyl(oxiranylmethyl) phosphonate with the wood at an elevated temperature to produce a flame resistant treated wood having the fabricated shape with the reacted phosphonate chemically bound in the treated wood.

3. The method of claim 2 wherein the differential pressure for impregnating the wood is an elevated pressure between about 5 and 1000 psig or a reduced pressure between about −3 and −14.5 psig.

4. The method of claim 2 wherein the dimethyl(oxiranylmethyl) phosphonate is reacted with the wood at a temperature above about 100° C. and for a time sufficient to bond the dimethyl (oxiranylmethyl) phosphonate in the wood.

5. The method of claim 2 wherein the dimethyl(oxiranylmethyl) phosphonate is impregnated into the wood in admixture with a non-reactive liquid carrier in a ratio by weight of the liquid carrier to dimethyl 2,3-epoxypropyl phosphonate between about 0.01 and 19 to 1 and after impregnation the liquid carrier is removed prior to reacting the dimethyl(oxiranylmethyl) phosphonate with the wood.

6. The method of claim 5 wherein the liquid carrier is water.

7. The method of claim 2 wherein the pressure for impregnating the wood is between about 20 and 100 psig, the dimethyl(oxiranylmethyl) phosphonate is impregnated into the wood with a non-reactive liquid carrier, after impregnation the liquid carrier is removed from the wood prior to reacting the dimethyl(oxiranylmethyl) phosphonate with the wood, and the dimethyl-(oxiranylmethyl) phosphonate is reacted with the wood at a temperature of between about 120° and 170° C. and time sufficient to bond the dimethyl(oxiranylmethyl)-phosphonate in the wood.

8. The method of claim 7 wherein the liquid carrier is water.

9. The method of claim 2 wherein the reaction of the dimethyl(oxiranylmethyl) phosphonate with the wood is conducted at a temperature between about 130° and 150° C.

10. The method of claim 2 wherein the wood is cedar.

11. A flame resistant treated wood produced by reacting dimethyl(oxiranylmethyl) phosphonate with exposed surfaces of the wood, wherein the flame resistant treated wood has a Limiting Oxygen Index as measured by ASTMD2863-70 of above about 30 percent oxygen.

12. The flame resistant treated wood of claim 11 wherein the wood reacted with the dimethyl(oxiranylmethyl) phosphonate was in the form of a fabricated shape.

13. The flame resistant, treated wood of claim 11 in the form of a wood roofing shingle.

14. The flame resistant, treated wood of claim 11 in the form of wood siding.

15. The flame resistant, treated wood of claim 11 in the form of plywood with at least one of two outermost layers impregnated with the dimethyl(oxiranylmethyl) phosphonate.

16. The flame resistant, treated wood of claim 11 wherein the Limiting Oxygen Index is between about 35 and 50 percent oxygen.

17. The flame resistant, treated wood of claim 11 wherein the percent by weight of the dimethyl(oxiranylmethyl) phosphonate reacted with the wood is between about 14 percent and 44 percent by weight of the wood to a depth of at least about 5 to 10 mm.

18. The flame resistant, treated wood product of claim 11 wherein the wood is a soft wood.

19. The flame resistant, treated wood of claim 11 wherein the wood is cedar.

20. The flame resistant, treated wood of claim 11 wherein the dimethyl(oxiranylmethyl) phosphonate is in the form of an oligomer.

* * * * *

UNITED STATES PATENT AND TRADEMARK OFFICE
CERTIFICATE OF CORRECTION

PATENT NO. : 4,654,277

DATED : March 31, 1987

INVENTOR(S) : Dalton C. MacWilliams and Henry N. Beck

It is certified that error appears in the above-identified patent and that said Letters Patent is hereby corrected as shown below:

Column 2, line 17, after "to" -- flow of -- should be inserted.

Column 2, line 46, "as", second occurrence should be -- is --

Column 6, line 59, "$^{c}$The pot residue includes oligomers of from 2 to about 4 units of DMOMP and is also effective to impart flame resistance. As used herein, the term "DMOMP" includes such oligomers." Should be deleted and the following inserted therefor --$^{c}$The pot residue includes oligomers of DMOMP and is also effective to impart flame resistance. As used heretin, the term "DMOMP" includes such oligomers. An oligomer includes 2 to 4 of the monomeric units.--

Column 8, line 5 "CMOMP" should be -- DMOMP --

Signed and Sealed this

Eleventh Day of August, 1987

*Attest:*

DONALD J. QUIGG

*Attesting Officer*

*Commissioner of Patents and Trademarks*